US006603771B1

United States Patent
Raza

(10) Patent No.: US 6,603,771 B1
(45) Date of Patent: Aug. 5, 2003

(54) HIGHLY SCALABLE ARCHITECTURE FOR IMPLEMENTING SWITCH FABRICS WITH QUALITY OF SERVICES

(75) Inventor: S. Babar Raza, Milpitas, CA (US)

(73) Assignee: Cypress Semiconductor Corp., San Jose, CA (US)

(*) Notice: Subject to any disclaimer, the term of this patent is extended or adjusted under 35 U.S.C. 154(b) by 0 days.

(21) Appl. No.: 09/347,830

(22) Filed: Jul. 2, 1999

(51) Int. Cl.[7] .............................................. H04L 12/56
(52) U.S. Cl. ........................................................ 370/412
(58) Field of Search ........................... 370/412, 384–389, 370/401, 447–449, 352, 413, 428, 217, 395, 330–335, 436

(56) References Cited

U.S. PATENT DOCUMENTS

| 4,885,739 A | * 12/1989 | Read et al. ................ 370/384 |
| 4,956,839 A | 9/1990 | Torii et al. .................... 370/60 |
| 5,101,404 A | 3/1992 | Kunimoto et al. ............ 370/60 |
| 5,247,671 A | 9/1993 | Adkins et al. ............... 395/650 |
| 5,251,206 A | 10/1993 | Calvignac et al. ......... 370/60.1 |
| 5,280,591 A | 1/1994 | Garcia ......................... 395/325 |
| 5,313,591 A | 5/1994 | Averill ......................... 395/325 |
| 5,319,754 A | 6/1994 | Meinecke et al. ........... 395/325 |
| 5,321,691 A | 6/1994 | Pashan ....................... 370/58.3 |
| RE34,896 E | 4/1995 | Calvignac et al. ............ 370/84 |
| 5,408,469 A | 4/1995 | Opher et al. ................ 370/60.1 |
| 5,418,781 A | 5/1995 | Kaufman et al. .............. 370/60 |
| 5,436,893 A | 7/1995 | Barnett ....................... 370/60.1 |
| 5,438,681 A | 8/1995 | Mensch, Jr. ................. 395/800 |
| 5,440,549 A | 8/1995 | Min et al. ..................... 370/60 |
| 5,440,698 A | 8/1995 | Sindhu et al. ......... 395/200.08 |
| 5,450,398 A | 9/1995 | Abefelt et al. ............. 370/60.1 |
| 5,452,259 A | 9/1995 | McLaury ............... 365/230.05 |
| 5,459,840 A | 10/1995 | Isfeld et al. ................. 395/309 |
| 5,469,545 A | 11/1995 | Vanbuskirk et al. ... 395/200.01 |
| 5,487,170 A | 1/1996 | Bass et al. ................... 395/732 |

(List continued on next page.)

Primary Examiner—Kwang Bin Yao
Assistant Examiner—Prenell Jones
(74) Attorney, Agent, or Firm—Christopher P. Maioriana, P.C.

(57) ABSTRACT

An apparatus comprising a plurality of interface circuits, a plurality of transmit outputs and a plurality of receive inputs. The plurality of interface circuits each comprises (i) a transmit circuit and (ii) a receive circuit. One of the plurality of transmit outputs is generally connected to one of the plurality of receive circuits. One of the plurality of receive inputs is generally connected to one of the plurality of transmit circuits. In general, each one of the plurality of transmits outputs are generally connected to one of the plurality of the receive inputs.

20 Claims, 3 Drawing Sheets

U.S. PATENT DOCUMENTS

| | | | |
|---|---|---|---|
| 5,499,239 A | 3/1996 | Munter | 370/60.1 |
| 5,504,741 A | 4/1996 | Yamanaka et al. | 370/58.2 |
| 5,537,400 A | 7/1996 | Diaz et al. | 370/58.2 |
| 5,566,171 A * | 10/1996 | Levinson | 370/352 |
| 5,577,032 A | 11/1996 | Sone et al. | 370/58.3 |
| 5,577,035 A | 11/1996 | Hayter et al. | 370/60 |
| 5,579,278 A | 11/1996 | McLaury | 365/230.05 |
| 5,581,713 A | 12/1996 | Myers et al. | 395/299 |
| 5,583,858 A | 12/1996 | Hanaoka | 370/392 |
| 5,617,367 A | 4/1997 | Holland et al. | 365/219 |
| 5,634,074 A | 5/1997 | Devon et al. | 395/828 |
| 5,654,968 A | 8/1997 | Smiroldo | 370/443 |
| 5,668,807 A | 9/1997 | Schachar et al. | 370/378 |
| 5,673,132 A | 9/1997 | Carbone, Jr. et al. | 359/177 |
| 5,724,351 A | 3/1998 | Chao et al. | 370/395 |
| 5,724,358 A | 3/1998 | Headrick et al. | 370/418 |
| 5,787,095 A | 7/1998 | Myers et al. | 371/68.1 |
| 5,790,539 A | 8/1998 | Chao et al. | 370/390 |
| 5,793,764 A | 8/1998 | Bartoldus et al. | 370/390 |
| 5,799,014 A | 8/1998 | Kozaki et al. | 370/358 |
| 5,802,052 A | 9/1998 | Venkataraman | 370/395 |
| 5,805,589 A * | 9/1998 | Hochschild | 370/389 |
| 5,835,498 A | 11/1998 | Kim et al. | 370/537 |
| 5,844,887 A | 12/1998 | Oren et al. | 370/218 |
| 5,850,395 A | 12/1998 | Hauser et al. | 370/398 |
| 5,852,606 A | 12/1998 | Prince et al. | 370/393 |
| 5,875,190 A | 2/1999 | Law | 370/395 |
| 5,912,889 A | 6/1999 | Preas et al. | 370/359 |
| 5,991,295 A | 11/1999 | Tout et al. | 370/376 |
| 6,215,769 B1 | 4/2001 | Ghani et al. | 370/230 |
| 6,246,682 B1 | 6/2001 | Roy et al. | 370/390 |
| 6,295,295 B1 | 9/2001 | Wicklund | 370/392 |
| 6,339,596 B1 | 1/2002 | Kozaki et al. | 370/395 |

\* cited by examiner

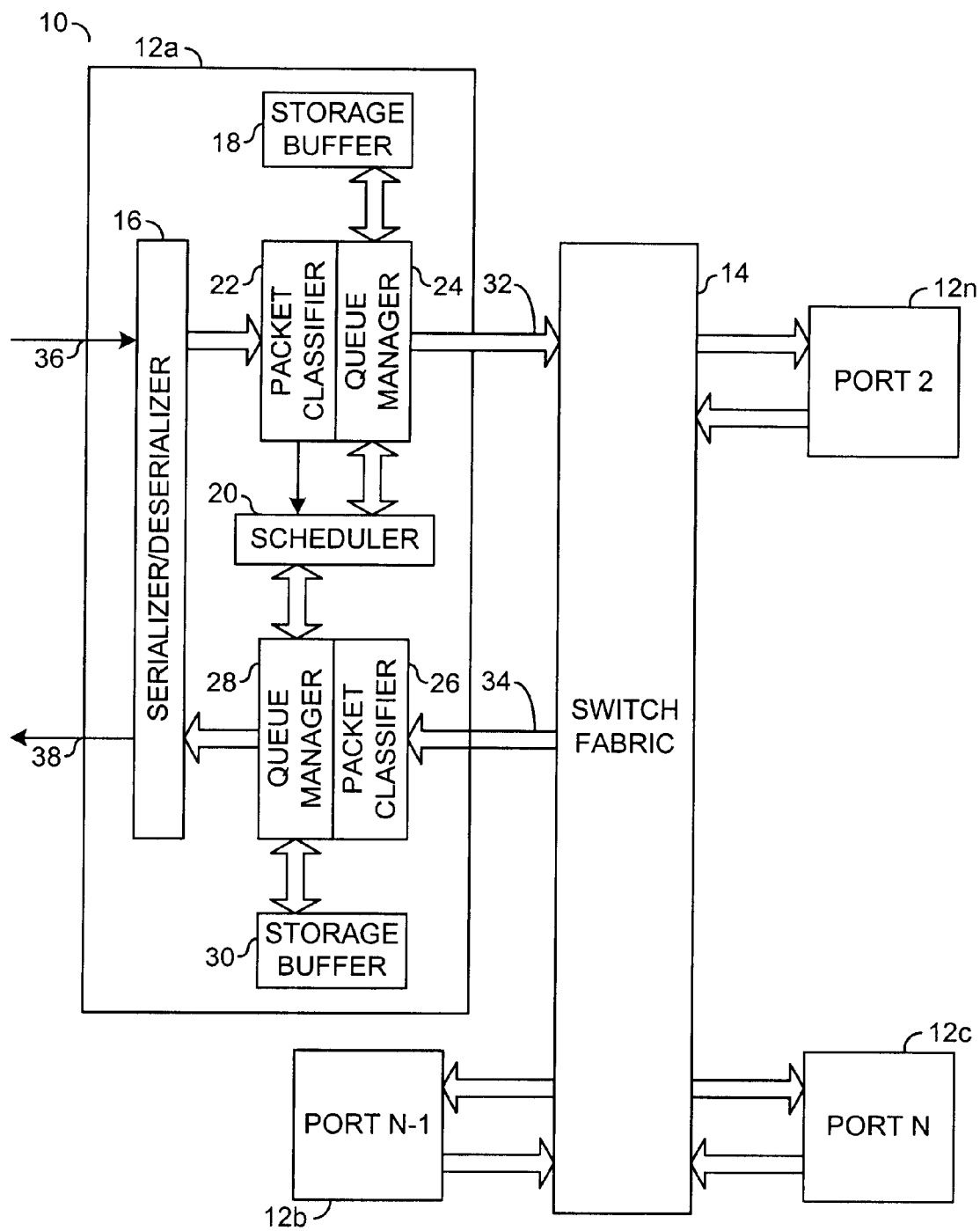
(CONVENTIONAL)
FIG. 1

HIGHLY SCALABLE ARCHITECTURE FOR IMPLEMENTING SWITCH FABRICS WITH QUALITY OF SERVICES

CROSS-REFERENCE TO RELATED APPLICATIONS

This application may relate to co-pending U.S. application Ser. No. 09/347,046, filed Jul. 2, 1999; and U.S. application Ser. No. 09/347,045, filed Jul. 2, 1999, which are each hereby incorporated by reference in their entirety.

FIELD OF THE INVENTION

The present invention relates to communication switching devices generally and, more particularly, to a highly scalable architecture for implementing switch fabrics with quality of services.

BACKGROUND OF THE INVENTION

Referring to FIG. 1, a block diagram of a circuit 10 is shown implementing a conventional crossbar switch fabric. A number of ports 12a–12n are shown connected to a switch fabric 14. The port 12a is shown comprising a serializer/deserializer block 16, a storage buffer 18, a scheduler 20, a packet classifier 22, a queue manager 24, a packet classifier 26, a queue manager 28 and a storage buffer 30. Each of the ports 12a–12n has similar components. A parallel bus 32 transmits data from the port 12a to the switch fabric 14. Similarly, a parallel bus 34 receives data from the switch fabric 14. A serial link 36 receives data from a line card (not shown) and a serial link 38 transmits data to the line card.

For the transmit side, the data arrives from the line card through the serial link 36. The data is deserialized into parallel data by the serializer/deserializer circuit 16 and then presented to the packet classifier 22. The packet classifier 22 looks at the information embedded within the packet data and determines the appropriate outgoing port 12a–12n that will receive the packet data. The packet classifier 22 may also determine the priority of the packet data from the embedded information. The queue manager 24 informs the scheduler 20 about the new packet arrival. The packet is stored in the storage buffer 18 until the packet is scheduled to go to the appropriate port 12a–12n through the switch fabric 14. The scheduler 20 of each port 12a–12n communicates with the port schedulers of the other ports 12a–12n and, based a predetermined algorithm, schedules packets from all the incoming ports 12a–12n to the outgoing ports 12a–12n through the switch fabric 14.

The packet classifier 22 and the queue manager 28 are normally implemented in an application specific integrated circuit (ASIC) or a field programmable gate array (FPGA). Similarly, the scheduler 20 is normally implemented in an ASIC or an FPGA. The storage buffers 18 and 30 are normally implemented using dual port memories. The switch fabric 14 is a large pin count cross bar chip or is constructed using PLDs to implement a multiplexer function with control signals. The receive side has a similar operation provided by the packet classifier 26, the queue manager 28 and the storage buffer 30. However, the receive side only has to process priority information and not port information.

The performance of the circuit 10 is limited by the speed and width of the circuit 10. To increase operating speed to a higher bandwidth requires either higher interface speed or an increased bus width of the switch fabric 14. Additionally, this configuration requires a switch fabric chip 14 to connect ports for switching.

SUMMARY OF THE INVENTION

The present invention concerns an apparatus comprising a plurality of interface circuits, a plurality of transmit outputs and a plurality of receive inputs. The plurality of interface circuits each comprises (i) a transmit circuit and (ii) a receive circuit. One of the plurality of transmit outputs is generally connected to one of the plurality of receive circuits. One of the plurality of receive inputs is generally connected to one of the plurality of transmit circuits. In general, each one of the plurality of the transmits outputs are generally connected to one of the plurality of the receive inputs.

The objects, features and advantages of the present invention include providing a communication interface that may (i) eliminate parallel interfaces from the system allowing more scalable solution, (ii) not require a separate switch fabric chip, (iii) be created by connecting the individual elements together, (iv) reduce the number of routes on the board which may reduce the board cost, (v) reduce the chip count for the system, and/or (vi) reduce power.

BRIEF DESCRIPTION OF THE DRAWINGS

These and other objects, features and advantages of the present invention will be apparent from the following detailed description and the appended claims and drawings in which:

FIG. 1 is a block diagram of a conventional communication switching device;

DETAILED DESCRIPTION OF THE PREFERRED EMBODIMENTS

Figure 2:
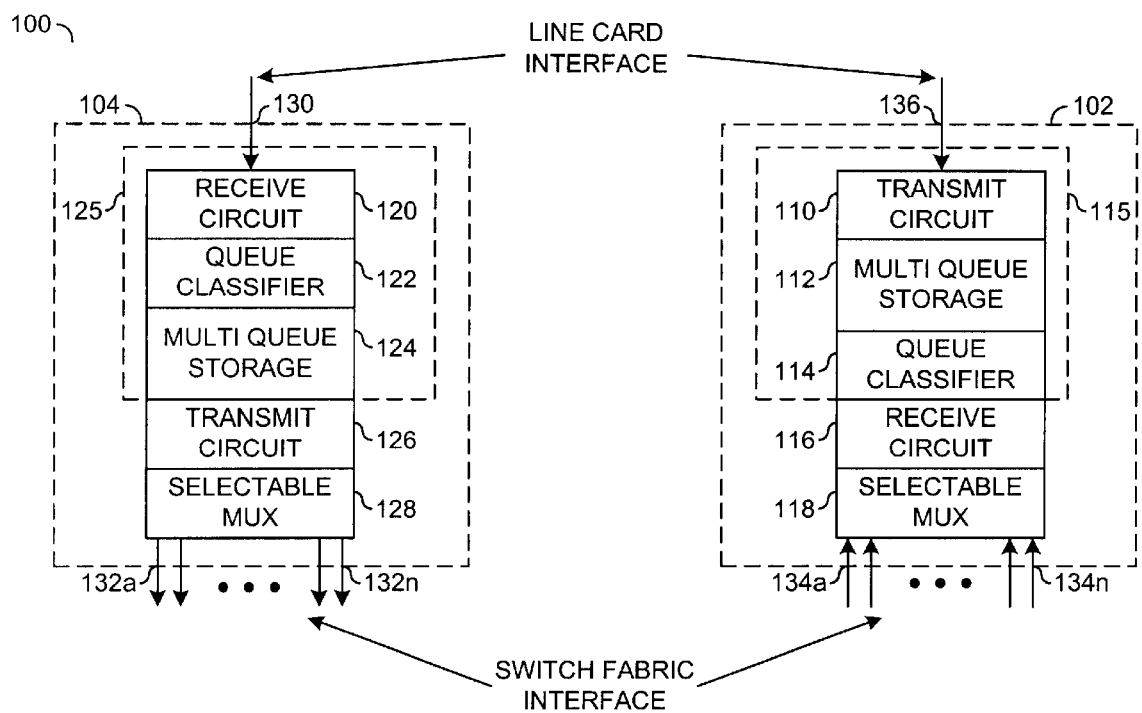
FIG. 2 is a diagram of a preferred embodiment of the present invention.

Referring to FIG. 2, a block diagram of a circuit 100 is shown in accordance with a preferred embodiment of the present invention. The circuit 100 generally comprises a receive block (or circuit) 102 and a transmit block (or circuit) 104. The receive circuit 102 may be implemented as a receive switch fabric element. The transmit circuit 104 may be implemented as a transmit switch fabric element.

The receive switch fabric element 102 generally comprises a transmit circuit 110, a multi-queue storage circuit 112, a queue classifier circuit 114, a receive circuit 116 and a selectable multiplexer 118. The transmit circuit 110, the multi-queue storage circuit 112 and the queue classifier 114 may be implemented, in one example, as a single chip 115. Similarly, the transmit switch fabric element 104 generally comprises a receive circuit 120, a queue classifier circuit 122, a multi-queue storage circuit 124, a transmit circuit 126 and a selectable multiplexer 128. The receive circuit 120, the queue classifier 122 and the multi-queue storage element 124 may be, in one example, implemented as a single chip 125. In another example, two or more of the transmit circuits 110, the multi-queue storage circuit 112, the queue classifier circuit 114, the receive circuit 116 and the selectable multiplexer 118 may be implemented as a single integrated circuit. Similarly, two or more of the receive circuit 120, the queue classifier circuit 122, the multi-queue storage circuit 124, the transmit circuit 126 and the selectable multiplexer 128 may be implemented as a single integrated circuit. In yet another example, two or more of the transmit circuit 110, the multi-queue storage circuit 112, the queue classifier circuit 114, a receive circuit 116, the selectable multiplexer 118, the receive circuit 120, the queue classifier circuit 122, the multi-queue storage circuit 124, the transmit circuit 126 and the selectable multiplexer 128 may be implemented as a single integrated circuit. Additionally, various sub-combinations of the transmit circuit 110, the multi-queue storage circuit 112, the queue classifier circuit 114, a receive circuit 116, the selectable multiplexer 118, the receive circuit 120, the queue classifier circuit 122, the multi-queue storage circuit 124, the transmit circuit 126 and the selectable multiplexer 128 may be implemented as two or more integrated circuits.

In the transmit switch fabric element 104, data is generally received from a line card (not shown) through a serial link 130 and converted into parallel data. The parallel data may then be presented to the queue classifier 122 which may determine the outgoing port information (and/or priority information) from embedded information in the data. The port information may then be presented to the multi-queue storage device 124. The multi-queue storage device 124 may be implemented as a queue manager and a storage buffer combined in one circuit. An example of the multi-queue storage device 124 may be found in co-pending application Ser. No. 09/347,046, filed Jul. 2, 1999, which is hereby incorporated by reference in its entirety. A queue manager portion may be constructed to support different queues for each output and for each priority. The ability to provide multiple priorities for each output may enable the multi-queue storage device 124 to provide quality of service (QoS). A scheduler portion (to be described in more detail in connection with FIG. 3) may provide the information about the outgoing port to the multi-queue portion 124 and to the selectable multiplexer circuit 128. Similarly, the scheduler may provide the information about the incoming port to the multi-queue portion 112 and to the selectable multiplexer circuit 118. The information about the outgoing and/or incoming port may be communicated to the multi-queue portion 124 (or 112) and the selectable multiplexer circuit 128 (or 118) through one or more interfaces. The data is then sent to the outgoing port through one or more outputs 132a–132n.

In the receive switch fabric element 102, the scheduler selects an input 134a–134n from which data is to be recovered. The data may be presented to the multi-queue storage element 112 to store the data with different levels of priority for supporting quality of service. The data may then be transmitted to the line card through a serial link 136.

Figure 3:
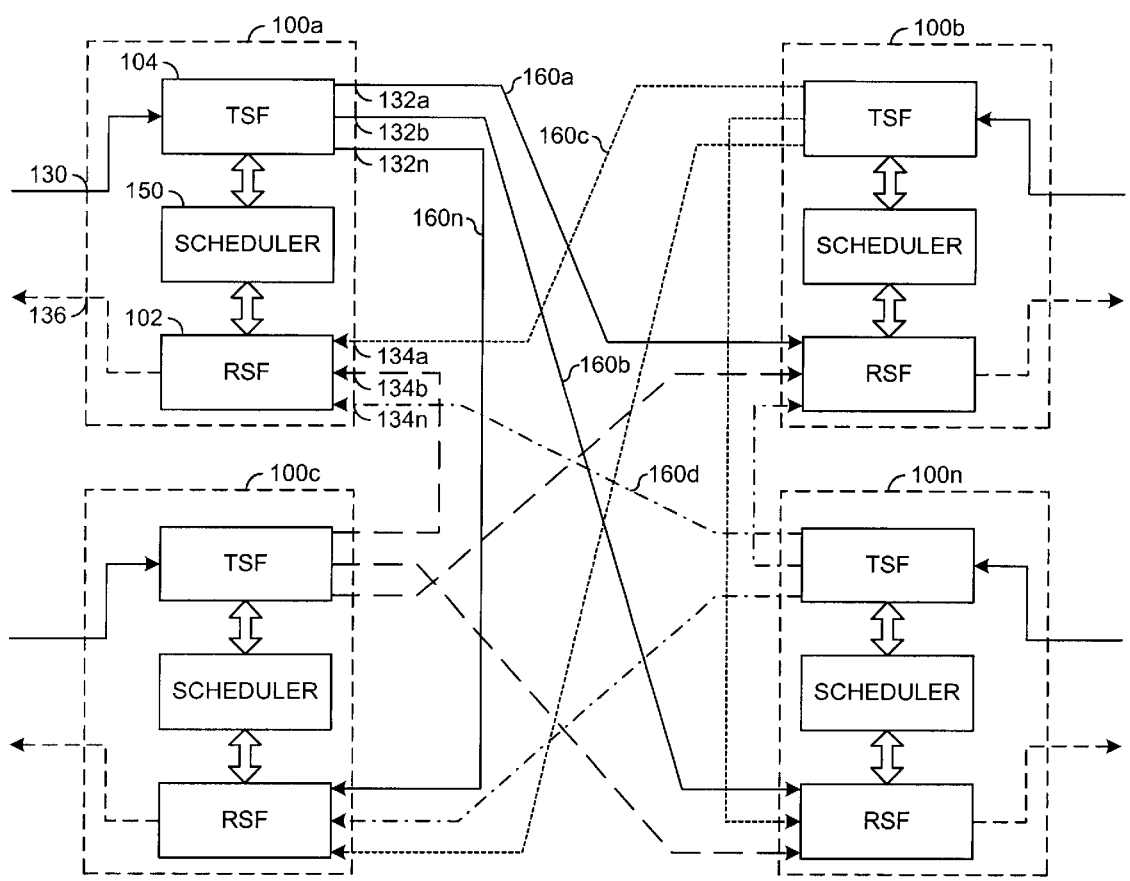
FIG. 3 is a diagram of an implementation of the preferred embodiment in the present invention.

FIG. 3 illustrates how a number of receive switch fabric elements 102 and a number of transmit switch fabric elements 104 may be combined in a number of interface circuits 100a–100n. A scheduler 150 may be implemented in each of the interface circuits 100a–100n of the interface circuits. The scheduler 150 may be configured to control the priority and port direction of the transmit switch fabric element 104 and the receive switch fabric element 102.

The interface circuits 100a–100n may be connected together through a number of links 160a–160n to function as a switch fabric. In general, each of the interface circuits 100a–100n is directly connected to each of the other interface circuits 100a–100n. The switch fabric function is implemented as only a number of routes (e.g., connections or links) on the board. In one example, the links 160a–160n may be implemented as one or more high speed serial links.

The transmit switch fabric element 104 and the receive switch fabric element 102 may be implemented as a chip set for the port or may be integrated into a single chip if the technology permits. In this case the parallel interface of FIG. 1 is not exposed at all. Thus, the limitations associated with the parallel interface of FIG. 1 may be eliminated. The circuit 100 may reduce the number of routes significantly as compared to the parallel interface of FIG. 1 because of the elimination of the parallel connections from one chip (e.g., the port 12a) to another (e.g., the port 12b). The example shown in the following TABLES 1 and 2 illustrates calculations for crossbar switch fabric and mesh switch fabric for 2.5 Gbps serial link for 4, 8, 16 and 32 port configurations.

TABLE 1

| Connections | 4 | 8 | 16 | 32 |
| --- | --- | --- | --- | --- |
| Serial Link | 16(4*2*2) | 32 | 64 | 128 |
| Serial Link --> PC/QM | 200(4*50) | 400 | 800 | 1600 |
| PC/QM --> Storage Buf | 200 | 400 | 800 | 1600 |
| Storage Buf --> SF | 200 | 400 | 400 | 1600 |
| Total | 616 | 1232 | 2464 | 4928 |
| Bandwidth | 10G | 20G | 40G | 80G |

TABLE 2

| Connections | 4 | 8 | 16 | 32 |
| --- | --- | --- | --- | --- |
| Serial Link | 16 | 32 | 64 | 128 |
| Switch Fabric | 24 | 112 | 480 | 1984 |
| Total | 40 | 144 | 544 | 2112 |
| Bandwidth | 10G | 20G | 40G | 80G |

The parallel bus speed used in the example is 100 MHz. For 2.5 Gbps bandwidth, a 25 pin wide bus would be required using the circuit of FIG. 1. In the present invention, each serial connection uses two routes. The transmit and receive generally doubles the number of routes. For example, between each element of the circuit of FIG. 1 the bus width for RX/TX would be 25 each.

TABLE 1 shows the total number of routes for the old method. The first row and first column shows how the calculations were derived. A pair of serial links for RX/TX for 4 ports results in 16 connections. TABLE 2 shows route/connection calculations for the present invention. The comparison of TABLE 1 and TABLE 2 shows that, for the same bandwidth, the number of connections/routes required are significantly less when implemented with the present invention. The chip count for the present invention will also be significantly less than the chip count of the circuit of FIG. 1. For example the circuit of FIG. 1 requires 2 chips for the packet classifier (PC)/Queue manager (QM) 22/24 and 28/26, two Dual port memories (i.e., 18, 30), one Serial/deserializer 16, one scheduler 20 and one PLD to implement switch fabric (multiplexer) 14 for each port 12a–12n. This implies seven chips per port or for 4, 8, 16, 32 port switch fabric, 28, 56, 112 and 224 chips, respectively.

However, even if the transmit switch fabric element 104 and the receive switch fabric element 102 are implemented as separate chips, the present invention would require three chips per port, including the scheduler. For a 4, 8, 16 and 32 port switch fabric, the present invention would require 12, 24, 48 and 96 chips, which is significantly smaller than the old method. When the transmit switch fabric element 104 and the receive switch fabric element 102 are integrated into a single chip, the chip count will further drop to 8, 16, 32 and 64, respectively. A lower chip count and smaller number of outputs toggling will also result in power reduction of the system.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a plurality of interface circuits each comprising (i) a transmit circuit comprising a plurality of transmit outputs, (ii) a receive circuit comprising a plurality of receive inputs and (iii) a scheduler circuit configured to control said transmit and receive circuits, wherein each one of said plurality of transmit outputs of one of said plurality of interface circuits is connected to one of said plurality of receive inputs of another of said plurality of interface circuits.

2. The apparatus according to claim 1, wherein said transmit outputs and said receive inputs are connected through a plurality of serial links.

3. The apparatus according to claim 1, wherein each of said transmit circuits comprises:
   a receive element;
   a queue classifier couplable to said receive element;
   a storage element couplable to said queue classifier;
   a transmit element couplable to said storage element; and
   a selectable multiplexer configured to couple said transmit element to said plurality of transmit outputs.

4. The apparatus according to claim 3, wherein two or more of said receive element, said queue classifier, said storage element, said transmit element and said selectable multiplexer are integrated as a single integrated circuit.

5. The apparatus according to claim 1, wherein each of said receive circuits comprises:
   a receive element;
   a queue classifier couplable to said receive element;
   a storage element couplable to said queue classifier;
   a transmit element couplable to said storage element; and
   a selectable multiplexer configured to couple said plurality of receive inputs to said receive element.

6. The apparatus according to claim 5, wherein two or more of said receive element, said queue classifier, said storage element, said transmit element and said selectable multiplexer are integrated as a single integrated circuit.

7. The apparatus according to claim 1, wherein:
   each of said transmit circuits comprises: (i) a first receive element, (ii) a first queue classifier, (iii) a first storage element, (iv) a first transmit element, and (v) a first selectable multiplexer; and
   each of said receive elements comprises (i) a second receive element, (ii) a second queue classifier, (iii) a second storage element, (iv) a second transmit element and (v) a second selectable multiplexer.

8. The apparatus according to claim 7, wherein two or more of said first receive element, said first queue classifier, said first storage element, said first transmit element, said first selectable multiplexer, said second receive element, said second receive element, said second storage element, said second transmit element and said second selectable multiplexer are integrated as a single integrated circuit.

9. The apparatus according to claim 1, wherein said scheduler circuit is configured to control priority and port direction of said transmit and receive circuits.

10. The apparatus according to claim 3, wherein two or more of said receive element, said queue classifier, said storage element, said transmit element and said selectable multiplexer are implemented as separate circuits.

11. The apparatus according to claim 5, wherein two or more of said receive element, said queue classifier, said storage element, said transmit element and said selectable multiplexer are implemented as separate circuits.

12. The apparatus according to claim 1, wherein each of said transmit and receive circuits comprise a multi-queue storage element.

13. An apparatus comprising:
   a plurality of interface means each comprising (i) transmit means comprising a plurality of transmit outputs, (ii) receive means comprising a plurality of receive inputs and (iii) scheduler means configured to control said transmit means and said receive means, wherein each one of said plurality of transmit outputs of one of said plurality of interface means is connected to one of said plurality of receive inputs of another of said plurality of interface means.

14. A method for providing a switch fabric, comprising the steps of:
   (A) providing a plurality of interface circuits each comprising (i) a transmit circuit having a plurality of transmit outputs, (ii) a receive circuit having a plurality of receive inputs and (iii) a scheduler circuit configured to control said transmit and receive circuits; and
   (B) connecting each one of said plurality of transmit outputs of one of said plurality of interface circuits to one of said plurality of receive inputs of another of said plurality of interface circuits.

15. The method according to claim 14, wherein said transmit outputs and said receive inputs are connected through a plurality of serial links.

16. The method according to claim 14, wherein step (A) further comprises:
   providing a first receive element;
   providing a first queue classifier;
   providing a first storage element;
   providing a first transmit element; and
   providing a first selectable multiplexer.

17. The method according to claim 16, wherein two or more of said first receive element, said first queue classifier, said first storage element, said first transmit element and said first selectable multiplexer are integrated as a single integrated circuit.

18. The method according to claim 16, wherein step (A) further comprises:
   providing a second receive element;
   providing a second queue classifier;
   providing a second storage element;
   providing a second transmit element; and
   providing a second selectable multiplexer.

19. The method according to claim 18, wherein two or more of said second receive element, said second queue classifier, said second storage element, said second transmit element and said second selectable multiplexer are integrated as a single integrated circuit.

20. The method according to claim 14, wherein said scheduler circuit is configured to control priority and port direction of said transmit and receive circuits.

* * * * *